US012747121B2

(12) United States Patent
Naramatsu et al.

(10) Patent No.: US 12,747,121 B2
(45) Date of Patent: Sep. 29, 2026

(54) LIQUID EJECTING DEVICE WITH SUPPORT PORTION THAT REDUCES SAGGING OF A PRINT MEDIUM

(71) Applicant: SEIKO EPSON CORPORATION, Tokyo (JP)

(72) Inventors: Yasuo Naramatsu, Matsumoto (JP); Hashiru Chino, Matsumoto (JP); Yohei Shibata, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 145 days.

(21) Appl. No.: 18/544,821

(22) Filed: Dec. 19, 2023

(65) Prior Publication Data

US 2024/0217764 A1 Jul. 4, 2024

(30) Foreign Application Priority Data

Dec. 23, 2022 (JP) ................................ 2022-206882

(51) Int. Cl.
*B65H 5/06* (2006.01)
*B41J 2/17* (2006.01)
(Continued)

(52) U.S. Cl.
CPC ............ *B65H 5/062* (2013.01); *B41J 2/1721* (2013.01); *B41J 3/4078* (2013.01); *B41J 15/04* (2013.01); *B41J 15/046* (2013.01); *B41J 15/165* (2013.01); *B65H 5/36* (2013.01); *B41J 2/01* (2013.01); *B41J 2002/012* (2013.01); *B41J 2/14* (2013.01); *B41J 2002/14193* (2013.01)

(58) Field of Classification Search
CPC .......... B65H 5/062; B65H 5/36; B41J 3/4078; B41J 2/14; B41J 2002/012; B41J 2002/14193; B41J 2/1721; B41J 15/165; B41J 2/01; B41J 15/04; B41J 15/046
See application file for complete search history.

(56) References Cited

U.S. PATENT DOCUMENTS

2007/0145678 A1* 6/2007 Terada .................. B65H 5/062 271/272
2015/0103124 A1* 4/2015 Imamura .................. B41J 15/04 347/102

(Continued)

FOREIGN PATENT DOCUMENTS

JP 2013-194332 A 9/2013

*Primary Examiner* — Henok D Legesse
(74) *Attorney, Agent, or Firm* — WORKMAN NYDEGGER

(57) ABSTRACT

A liquid ejecting device includes a transport unit, an ejecting unit, a receiving groove portion, a guide portion, and a support portion. The transport unit transports a medium in a transport direction while nipping the medium by a first roller and a second roller capable of pressing the medium toward the first roller. The ejecting unit ejects a liquid onto the medium at a position downstream of the transport unit in the transport direction. The receiving groove portion faces the ejecting unit in a height direction intersecting the transport direction. The guide portion guides the medium at a position downstream of the ejecting unit in the transport direction. The support portion is provided so as to be able to support the medium at a position upstream of the receiving groove portion and downstream of the transport unit in the transport direction.

8 Claims, 8 Drawing Sheets

(51) Int. Cl.

| | |
|---|---|
| ***B41J 3/407*** | (2006.01) |
| ***B41J 15/04*** | (2006.01) |
| ***B41J 15/16*** | (2006.01) |
| ***B65H 5/36*** | (2006.01) |
| *B41J 2/01* | (2006.01) |
| *B41J 2/14* | (2006.01) |

(56) References Cited

U.S. PATENT DOCUMENTS

2016/0039222 A1* 2/2016 Kamijo ................ B41J 11/0085
347/104
2018/0117907 A1* 5/2018 Yamamuro ............ B41J 2/0451

* cited by examiner

LIQUID EJECTING DEVICE WITH SUPPORT PORTION THAT REDUCES SAGGING OF A PRINT MEDIUM

The present application is based on, and claims priority from JP Application Serial Number 2022-206882, filed Dec. 23, 2022, the disclosure of which is hereby incorporated by reference herein in its entirety.

BACKGROUND

1. Technical Field

The present disclosure relates to a liquid ejecting device including a transport unit that transports a medium, and an ejecting unit that ejects a liquid such as ink onto the medium.

2. Related Art

For example, JP-A-2013-194332 discloses an ink jet recording device (an example of a liquid ejecting device) including a roller pair (an example of a transport unit) that transports a medium such as fabric, and an ejecting head (an example of an ejecting unit) that ejects a liquid such as ink toward the medium.

This recording device includes an ink receiving portion (an example of a receiving groove portion) including a recessed groove whose upper side is open, at a position on the opposite side of the ejecting head in the vertical direction with a transport path of the medium interposed therebetween. The ink receiving portion includes the recessed groove that receives and collects ink droplets dropped through the medium.

A region facing the ejecting head is a printing region (ink ejection region) in which printing is performed on the medium. The transport unit is disposed upstream of the printing region in a transport direction of the medium. In addition, a transport roller (an example of a guide portion) is disposed at a position downstream of the printing region. In the recording device, a portion of the medium positioned in the printing region is supported in the air by the transport unit and the guide portion.

However, in recent years, the length of the ejecting unit in the transport direction is getting longer. Accordingly, the distance between the transport unit and the guide portion is also getting longer. When a configuration is adopted in which the medium is pulled by the transport unit and the guide portion, for example, if the medium is a soft object such as fabric, there is a possibility that the medium becomes slack in the vicinity of the ejecting unit. Thus, there is a problem that it is difficult for the ejecting unit to secure a required printing quality when printing is performed on the slackened medium. Therefore, even in a liquid ejecting device having a configuration in which the medium is transported in a state of being pulled in the air between the transport unit and the guide portion, there is a demand for suppressing the slackening of the medium in an ejection region of the ejecting unit.

SUMMARY

A liquid ejecting device for solving the problem described above includes a transport unit configured to transport a medium in a transport direction while nipping the medium between a first roller and a second roller configured to press the medium toward the first roller, an ejecting unit configured to eject a liquid onto the medium at a position downstream of the transport unit in the transport direction, a receiving groove portion facing the ejecting unit in a height direction intersecting the transport direction, a guide portion configured to guide the medium at a position downstream of the ejecting unit in the transport direction, and a support portion configured to support the medium at a position upstream of the receiving groove portion and downstream of the transport unit in the transport direction.

DESCRIPTION OF EMBODIMENTS

First Embodiment

A liquid ejecting device according to a first embodiment will be described below with reference to the drawings.

Figure 1:
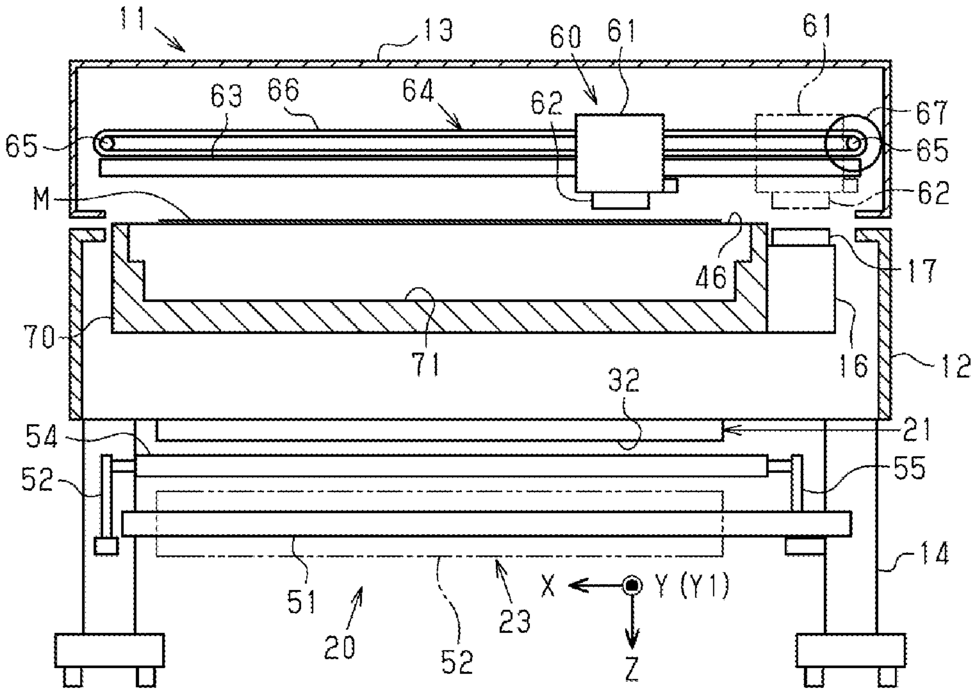
FIG. 1 is a schematic front cross-sectional view illustrating a liquid ejecting device according to a first embodiment.
Figure 2:
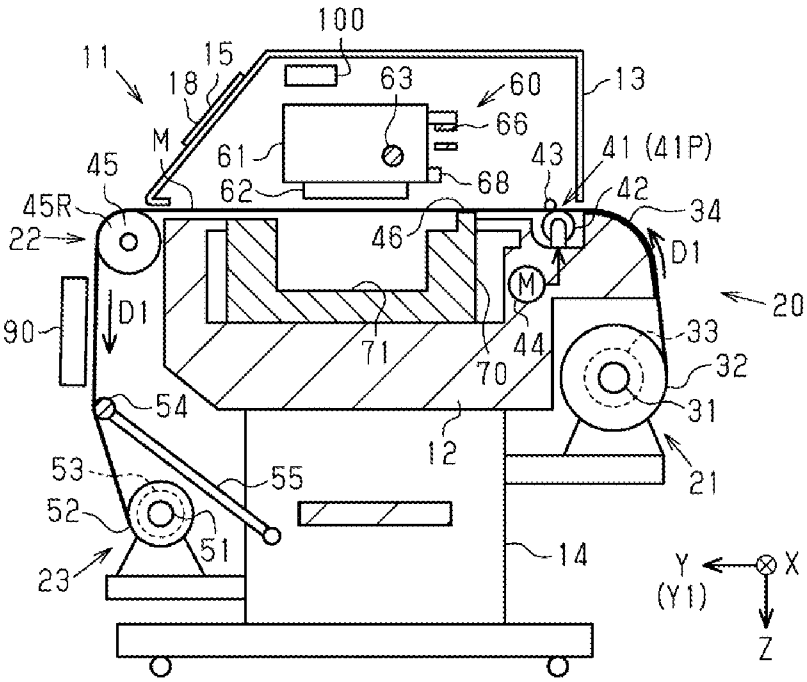
FIG. 2 is a schematic side cross-sectional view illustrating the liquid ejecting device.

In FIGS. 1 and 2, a Z-axis represents the direction of gravity, and an X-axis and a Y-axis represent directions along a horizontal plane, assuming that a liquid ejecting device 11 is placed on the horizontal plane. The X-axis, the Y-axis, and the Z-axis are perpendicular to each other. In the following description, a direction along the X-axis will be also referred to as a scanning direction X since it is a direction in which an ejecting unit 62 described below is caused to perform scanning. Further, a direction along the Z-axis will be also referred to as a vertical direction Z. A direction along the Y-axis will be also referred to as a transport direction Y since it is a direction in which a medium M is transported at a printing position at which printing is performed on the medium M. Further, the direction along the X-axis will be also referred to as a width direction X since it is a width direction of the medium M.

Configuration of Liquid Ejecting Device 11

As illustrated in FIGS. 1 and 2, the liquid ejecting device 11 includes the ejecting unit 62 that ejects ink, which is an example of a liquid, onto the medium M. The liquid ejecting device 11 is an ink jet-type printing device that performs printing on the medium M by causing the ejecting unit 62 to eject the ink onto the medium M. The liquid ejecting device 11 is, for example, a textile printing device that performs printing on the medium M such as a long fabric. The liquid ejecting device 11 is, for example, a digital textile printing device in which the ejecting unit 62 ejects the ink onto the medium M such as fabric based on print data. Further, the liquid ejecting device 11 includes a base portion 70 (platen) that supports the medium M.

The base portion 70 includes a receiving groove portion 71. In other words, the liquid ejecting device 11 according to the embodiment is a gutter platen-type textile printing device including the receiving groove portion 71. The receiving groove portion 71 faces the ejecting unit 62 in a height direction −Z intersecting a transport direction D1.

As illustrated in FIGS. 1 and 2, the liquid ejecting device 11 may include a base 12 having a column-beam structure, and a housing 13 supported by the base 12. The liquid ejecting device 11 includes a transport device 20 that transports the medium M, and a printing unit 60 that performs printing on the medium M. The transport device 20 and the printing unit 60 are supported by the base 12. The base 12 is supported by a floor surface via leg portions 14. The housing 13 covers a scanning region that is a region in which a carriage 61 and the ejecting unit 62 move in the scanning direction X during the printing.

As illustrated in FIG. 2, the transport device 20 transports the medium M in the transport direction D1 indicated by solid arrows in FIG. 2. A direction orthogonal to the transport direction D1 of the medium M (a direction orthogonal to the paper surface of FIG. 2) is the width direction X. The width direction X is also the scanning direction X in which the carriage 61 moves. In the embodiment, the scanning direction X and the transport direction Y1 are directions intersecting (for example, orthogonal to) each other, and both of the directions intersect (for example, are orthogonal to) the vertical direction Z. Note that the transport direction D1 of the medium M changes depending on a position of the medium M in a transport path, as indicated by the solid arrows in FIG. 2.

As illustrated in FIG. 2, the transport device 20 includes a feeding unit 21, a transport mechanism 22, and a winding unit 23. The feeding unit 21 feeds the medium M from a first roll 32. The feeding unit 21 includes a roll body support shaft 31 that rotatably supports the first roll 32 around which the medium M is wound in a roll shape, and a feeding motor 33 that outputs power to rotate the first roll 32. The medium M fed from the feeding unit 21 is guided by a curved guide surface 34, and is fed to the transport mechanism 22.

The transport mechanism 22 transports the medium M fed by the feeding unit 21 along the transport direction Y1. The transport mechanism 22 includes a transport unit 41 at a position upstream of the ejecting unit 62 in the transport direction Y1. The transport unit 41 is, for example, a transport roller pair 41P. The transport unit 41 includes the first roller 42, and a second roller 43 that can press the medium M toward the first roller 42. The transport unit 41 transports the medium M in the transport direction D1 while nipping the medium M by the first roller 42 and the second roller 43. The first roller 42 is a driving roller, and the second roller 43 is a driven roller. The transport roller pair 41P is constituted by a pair of the driving roller and the driven roller.

The transport unit 41 includes a transport motor 44 that is a driving source of the transport roller pair 41P. The first roller 42, which is the driving roller, is rotated by the power of the transport motor 44. As a result, the medium M is fed downstream in the transport direction Y1 in a state of being nipped by the transport roller pair 41P.

The liquid ejecting device 11 includes the guide portion 45 that guides the medium M, at a position downstream of the ejecting unit 62 in the transport direction Y1. The guide portion 45 is, for example, a guide roller 45R. The guide roller 45R may be, for example, a driving roller rotated by power of a driving unit such as a motor (not illustrated). Further, the guide roller 45R may be a driven roller rotated by frictional resistance received from the transported medium M.

The receiving groove portion 71 is positioned to face the ejecting portion 62 in the height direction −Z. The ejecting unit 62 ejects the liquid onto the medium M at a position downstream of the transport unit 41 in the transport direction Y1. An ejected region onto which the ejecting unit 62 ejects the liquid is also referred to as a printing region. The printing region is a region onto which the ejecting unit 62 ejects the liquid in the course of moving in the scanning direction X during the printing, and is long in the width direction X. The receiving groove portion 71 is a groove portion having an opening wider than the printing region, in order to receive the liquid ejected from the ejecting unit 62.

The transport unit 41 nips the medium M at a position upstream of the receiving groove portion 71 in the transport direction D1. On the other hand, the guide portion 45 guides the medium M at a position downstream of the receiving groove portion 71 in the transport direction D1. During transportation, the medium M is horizontally supported, in a state of floating in the air, between the transport unit 41 and the guide portion 45 as a result of a tension that is equal to or greater than a predetermined tension being applied to the medium M, over a part of the printing region corresponding to the receiving groove portion 71. In this way, the medium M is transported in a state of being pulled in the horizontal direction at a height position higher than the opening of the receiving groove portion 71 by the transport portion 41 and the guide portion 45.

The winding unit 23 winds the medium M on which the printing has been already performed. The winding unit 23 includes a rotation support shaft 51 that rotatably supports the second roll 52, and a winding motor 53 that is a driving source of the winding unit 23. When the winding motor 53 is driven, the second roll 52 winds the medium M on which the printing has been already performed. A tension bar 54, which comes into contact with the medium M to apply a tension to the medium M, is disposed between the guide roller 45R and the winding unit 23. The winding unit 23 winds the medium M to which the tension is applied by the tension bar 54, around the second roll 52. Note that the tension bar 54 is supported by a pair of arms 55. The tips of the pair of arms 55 are coupled to both end portions of the tension bar 54 in the width direction X, respectively, and base end portions of the pair of arms 55 are rotatably supported by the leg portions 14.

The winding unit 23 is positioned below the guide portion 45. Thus, the guide portion 45 guides the medium M, which is horizontally transported through the printing region, downward toward a lower position at which the winding portion 23 is positioned. Therefore, a winding amount (winding angle), by which the medium M is wound around the outer circumferential surface of the guide roller 45R, is relatively large. The larger the winding amount of the medium M on the outer circumferential surface of the guide roller 45R, the larger the contact area between the medium M and the guide roller 45R. Since the larger the contact area, the larger the frictional resistance that is generated, the medium M is unlikely to slip on the outer circumferential surface of the guide roller 45R.

As illustrated in FIGS. 1 and 2, the printing unit 60 includes the above-described ejecting unit 62. The liquid ejecting device 11 in this example employs a serial printing method. When the serial printing method is employed, the printing unit 60 includes the carriage 61 at which the ejecting unit 62 is mounted. The carriage 61 reciprocates in the scanning direction X intersecting the transport direction Y1 of the medium M. The ejecting unit 62 is mounted at the carriage 61. When the carriage 61 reciprocates in the scanning direction X, the printing unit 60 ejects the ink from the ejecting unit 62 toward the medium M during at least one of the forward movement and the return movement of the carriage 61.

In addition to the carriage 61 and the ejecting unit 62, the printing unit 60 includes a guide shaft 63 that guides the carriage 61 along a scanning path, a carriage motor 67 that is a driving source of the carriage 61, and a power transmission mechanism 64 that transmits power of the carriage motor 67 to the carriage 61. The power transmission mechanism is, for example, a belt-type power transmission mechanism. Specifically, the power transmission mechanism 64 includes a pair of pulleys 65 (see FIG. 1), and an endless timing belt 66 wound over the pair of pulleys 65. One of the pulleys 65 is coupled to an output shaft of the carriage motor 67. The carriage 61 is fixed to a portion of the timing belt 66.

The carriage 61 is driven by the carriage motor 67, and is configured to be able to reciprocate in the width direction X of the medium M along the guide shaft 63. In the course of the carriage 61 moving in the width direction X of the medium M, the ejecting unit 62 performs the printing on the medium M, which is horizontally held in the printing region. In the serial printing method, a character or an image is printed on the medium M by alternately performing a printing operation in which printing for one line (one scan) is performed by the ejecting unit 62 ejecting the liquid while moving, and a transport operation in which the transport device 20 transports the medium M to the next printing position.

The liquid ejecting device 11 includes a maintenance device 16 that performs maintenance of the ejecting unit 62. The maintenance device 16 is disposed at a position below the ejecting unit 62 so as to face the ejecting unit 62 when the ejecting unit 62 is positioned at a home position indicated by a two dot chain line in FIG. 1. The home position is a standby position of the ejecting unit 62 when the printing is not being performed. The maintenance device 16 includes a cap 17. The cap 17 is configured to be movable between a capping position at which the cap 17 comes into contact with a nozzle surface 62A (see FIG. 7) of the ejecting unit 62, and a retracted position, illustrated in FIG. 1, at which the cap 17 is separated from the nozzle surface 62A.

The liquid ejecting device 11 includes a liquid supply unit (not illustrated) that supplies the liquid such as the ink to the ejecting unit 62. The ejecting unit 62 includes nozzles 62N (see FIG. 7) that eject the liquid such as the ink supplied from the liquid supply unit. The liquid supply unit is constituted by, for example, a liquid cartridge that is mounted by a user in a detachable state, or a liquid tank that is replenished with the liquid such as the ink by the user. The carriage 61 is coupled to the liquid supply unit through a tube (not illustrated). The liquid such as the ink is supplied from the liquid supply unit to the ejecting unit 62 through the tube. The liquid supply units store inks of a plurality of colors including, for example, cyan, magenta, yellow, and black, respectively. Note that the ejecting unit 62 is also referred to as a printing head.

The liquid ejecting device 11 includes a control unit 100 (see FIG. 2) that controls the transport device 20 and the printing unit 60. The liquid ejecting device 11 includes a display unit 15. On the display unit 15, a menu, various messages for notifying the user of the state of the liquid ejecting device 11, and the like are displayed. A setting screen, on which the user inputs printing condition information, including the type of the medium M, with respect to the liquid ejecting device 11, is displayed on the display unit 15 of this example.

The display unit 15 may have, for example, a touch panel function, and the user may be able to perform an operation of inputting necessary information using the touch panel function of the display unit 15. The touch panel function of the display unit 15 constitutes an operation unit 18.

By operating the operation unit 18, the user can give various commands such as input of the printing condition information and start of the printing, with respect to the liquid ejecting device 11. The print condition information includes the type and the size of the medium M. The type of the medium M may include fabric, a knitted object, or the like. Further, the type of the medium M may include board paper. The fabric may include a woven fabric, a non-woven fabric, or the like. Here, the fabric and the knitted object belong to a soft medium M1. On the other hand, the board paper belongs to a hard medium M2. The liquid ejecting device 11 may be a model capable of performing the printing only on the soft medium M1 as the medium M, or may be a model capable of performing the printing on both the soft medium M1 and the hard medium M2.

The liquid ejecting device 11 may include a width detector 68 that detects the width of the medium M. In the example illustrated in FIG. 2, the width detector 68 is provided at the carriage 61, for example. The width detector 68 detects lateral ends of the medium M in the width direction X in the course of moving in the width direction X together with the carriage 61. The control unit 100 identifies the width of the medium M based on the position of the carriage 61 (carriage position), and a detection signal input from the width detector 68. By detecting the width of the medium M, the control unit 100 determines whether or not the medium M that is actually transported matches the size of the medium M specified in the printing condition information. Further, the control unit 100 detects deviation of the medium M in the width direction X, and adjusts a region, in the width direction X, onto which the liquid is ejected, based on the deviated position of the medium M. The control unit 100 controls the ejection region of the liquid so that the liquid ejected from the ejecting unit 62 does not protrude to the outside of the medium M even when the medium M is transported while deviating in the width direction X.

The printing method of the liquid ejecting device 11 is not limited to the serial printing method, and may be a line printing method. When the line printing method is employed, the ejecting unit 62 is constituted by a line head having a number of the nozzles 62N capable of simultaneously ejecting the liquid onto the entire region, in the width direction, of the medium M transported by the transport device 20. By the ejecting unit 62, which employs the line printing method, simultaneously ejecting the liquid onto the entire region, in the width direction, of the medium M transported at a predetermined transport speed by the transport device 20, an image or the like is printed on the medium M.

The medium M becomes slack unless a tension equal to or greater than a certain amount of tension is applied to a portion of the medium M between the transport unit 41 and the guide portion 45. When this type of slackening occurs, the gap between the ejecting unit 62 and the medium M varies, and thus, the position at which the liquid droplet ejected by the ejecting unit 62 lands on the medium M deviates from a target position. Specifically, the ejecting unit 62 ejects the liquid droplets while moving in the scanning direction X together with the carriage 61. Therefore, the liquid droplets ejected from the ejecting unit 62 have a velocity component in the vertical direction Z and a velocity component in the scanning direction X. In other words, the liquid droplets ejected from the ejecting unit 62 move not only in the vertical direction Z but also in the scanning direction X in the course of being ejected from the position of the nozzle to the landing position on the surface of the medium M. The moving distance in the scanning direction X depends on the gap between the ejecting unit 62 and the medium M. In other words, when the gap varies, the landing position of the liquid droplet with respect to the surface of the medium M deviates in the width direction X. Due to this deviation, a printing failure in which a printed dot deviates from the target position is likely to occur. Thus, when the medium M becomes slack, and as a result, the gap varies, the printing quality deteriorates.

In the embodiment, a configuration is provided in which this type of slackening of the medium M is effectively suppressed. As a part of this configuration, the liquid ejecting device 11 includes a support portion 46 at a position downstream of the transport portion 41 and upstream of the receiving groove portion 71 in the transport direction D1. The support portion 46 is constituted by a protruding portion that protrudes in the height direction −Z so as to be able to support a non-printed surface (back surface) of the medium M. The support portion 46 supports the medium M over the entire region or a part of the region of the medium M in the width direction X. The support portion 46 may be provided so as to extend in the width direction X.

Since the medium M is supported by the support portion 46 also at a position between the transport portion 41 and the guide portion 45 in the transport direction D1, compared to a configuration in which the medium M is guided and supported at only two positions, namely, at the transport unit 41 and the guide portion 45, sagging due to the slackening of the medium M is less likely to occur. Thus, a sagging amount by which the medium M is displaced in the vertical direction Z with respect to the horizontal direction is suppressed to be small in relation to the tension applied to the portion of the medium M between the transport unit 41 and the guide portion 45.

Medium Support Structure

Figure 3:
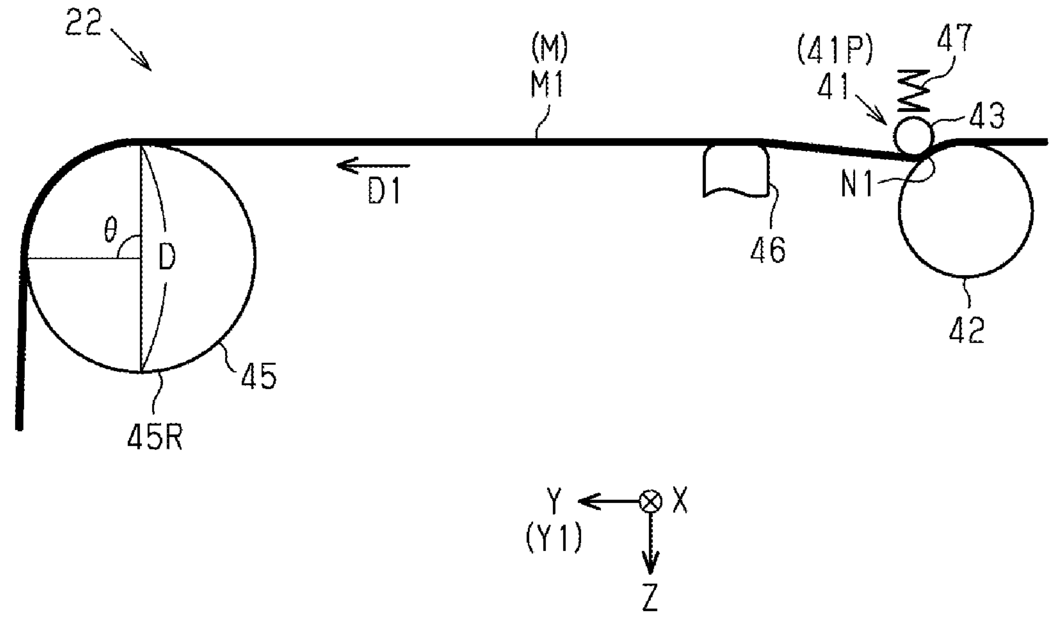
FIG. 3 is a schematic side view illustrating a transport mechanism when transporting a soft medium.

As illustrated in FIG. 3, a height position at which the first roller 42 supports the medium M and a height position at which the guide roller 45R supports the medium M are set at the same height in the vertical direction Z. Further, a height position at which the support portion 46 supports the medium M is set to be the same height position as the upper end of the first roller 42 and the upper end of the guide roller 45R.

The support portion 46 is provided so as to be able to support the medium M at the same height as the guide portion 45 in the height direction −Z. In other words, the upper end of the support portion 46 and the upper end of the guide portion 45 are set to be the same height in the height direction −Z. Here, “the same height” means that the height of the upper end at which the support portion 46 supports the medium M and the height of the upper end at which the guide portion 45 supports the medium M are the same.

Note that “the same” does not mean completely the same but also includes a slight deviation (for example, a deviation within a range of 1 μm to 1 mm). The same height may be a same height within an allowable tolerance, or two different positions of the medium M may be regarded as being at the same height unless there is a difference, among the nozzles 62N, in the flying distance of ink droplets from the nozzle 62N (see FIG. 3) of the ejecting unit 62 to the surface of the medium M, that may affect the printing quality. Even if there is a difference in height, for example, a difference within a range of 1 mm, between the height at which the guide portion 45 supports the medium M and the height at which the support portion 46 supports the medium M, these two heights may be regarded as the same heights.

As illustrated in FIG. 3, the transport unit 41 transports the medium M in a state in which the medium M is nipped between the first roller 42 and the second roller 43. The axial center of the second roller 43 is disposed at a position slightly shifted downstream in the transport direction D1 from the axial center of the first roller 42. The second roller 43 is urged in a direction toward the first roller 42 by an elastic member 47 such as a spring. The second roller 43 is rotatably held by a tip portion of a holding member (not illustrated). The holding member is provided so as to be rotatable within a range of a predetermined angle around a rotational movement shaft thereof, and the holding member is urged by the elastic member 47 in a direction in which the second roller 43 is pressed against the first roller 42. Thus, the soft medium M1 such as the fabric is nipped at a nip position N1 having a height slightly lower than the height of the upper end of the first roller 42. In other words, the nip position N1 is lower than the upper end of the first roller 42.

The upper end of the guide portion 45 and the upper end of the first roller 42 are at the same height position. The upper end of the support portion 46 and the upper end of the first roller 42 are at the same height position. Thus, a virtual line connecting the upper end of the first roller 42 and the upper end of the guide portion 45 is also in contact with the upper end of the support portion 46. Although this virtual line corresponds to a medium transport path, the medium M simply being in contact with the upper end of the support portion 46 does not mean that the medium M is supported. For example, the soft medium M1 such as the fabric is likely to float up from the support portion 46.

Therefore, in order to make it less likely for the medium M1 to float up from the upper end of the support portion 46, the nip position N1 of the transport roller pair 41P is set to the position lower than the height position of the upper end of the first roller 42. By being supported by the support portion 46, the medium M1 pushed down to the nip position N1 by the second roller 43 is pushed up to the same height as the guide portion 45. Thus, the medium M1 moving from the nip position N1 to the guide portion 45 via the support portion 46 is pressed against the support portion 46 with a predetermined pressing force. Due to this pressing force, the medium M is unlikely to float up from the support portion 46.

Further, since the nip position N1 is lower than the upper end of the first roller 42, the winding amount of the medium M1 wound around the outer circumferential surface of the first roller 42 is relatively large. The large winding amount generates a large frictional resistance between the outer circumferential surface of the first roller 42 and the medium M1. As a result, the medium M1 is less likely to slip on the transport roller pair 41P, and thus, the transport accuracy of the medium M1 is secured. When the transport accuracy of the medium M1 is secured, a printing misalignment is suppressed, and thus, a high printing quality is secured.

Further, the transport roller pair 41P receives, from the medium M1 fed from the feeding unit 21, a tension directed upstream in the transport direction D1. This is because the feeding speed at which the feeding unit 21 feeds the medium M1 and the transport speed at which the transport roller pair 41P transports the medium M are controlled such that a predetermined tension is applied to a portion of the medium M1 between the first roll 32 and the transport roller pair 41P. The tension directed upstream in the transport direction D1 received by the transport roller pair M1 from the medium M1 is also referred to as a front tension. When the medium M1 slips at the transport roller pair 41P due to the front tension, the transport accuracy of the medium M1 deteriorates. However, the transport accuracy of the medium M1 by the transport roller pair 41P is secured by the large frictional force, which is generated due to the above-described large winding amount at the first roller 42 and which exceeds the front tension.

On the other hand, the guide roller 45R constituting the guide portion 45 guides the medium M in a state of supporting the medium M at the same height as the support portion 46. When the guide roller 45R is a driven roller, the guide roller 45R is driven to rotate by the transportation of the medium M. On the other hand, when the guide roller 45R is a driving roller, the guide roller 45R applies to the medium M a transport force in the transport direction D1.

The guide roller 45R guides the medium M transported in a horizontal posture between the transport unit 41 and the guide roller 45R, downward toward the winding unit 23 (see FIG. 2). Therefore, the soft medium M1 such as the fabric as illustrated in FIG. 3 is wound around a portion of the outer circumferential surface of the guide roller 45R. Thus, a winding angle θ is relatively large.

Here, a winding area of the medium M on the guide roller 45R is represented by D*θ*w, where D is the diameter of the guide roller 45R, θ is the winding angle, and w is the width of the medium M. Frictional resistance corresponding to the winding area is generated between the guide roller 45R and the soft medium M1.

As a result of being pressed by the tension bar 54 (see FIG. 2), a predetermined tension is generated at a portion of the medium M between the guide portion 45 and the winding portion. The tension applied to the medium M by the tension bar 54 is unlikely to be transmitted to the printing region due to the frictional force between the medium M and the guide roller 45R. Thus, the medium M in the printing region is not excessively pulled downstream in the transport direction Y1. Here, if the medium M in the printing region is excessively pulled downstream in the transport direction Y1, slippage of the medium M1 may occur at the transport roller pair 41P. However, due to the relatively large frictional force of the guide roller 45R, the medium M1 is unlikely to be pulled downstream in the transport direction Y1 in the printing region, and from this point also, the transport accuracy of the medium M1 by the transport roller pair 41P is secured. The diameters D of the guide roller 45R is set while taking into account the frictional resistance against the medium M1.

Figure 4:
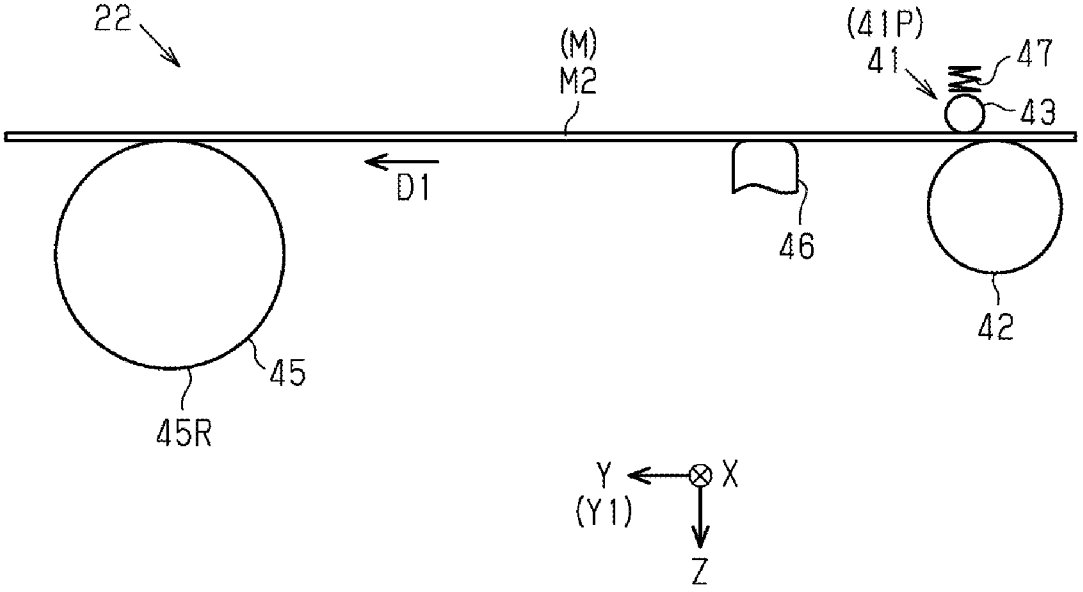
FIG. 4 is a schematic side view illustrating the transport mechanism when transporting a hard medium.

As illustrated in FIG. 4, the hard medium M2 such as the board paper may be transported as the medium M. For example, when test printing is performed on the fabric, there is a case in which board paper to which fabric is attached is used as the medium M2. In this case, the hard medium M2 such as the board paper is horizontally transported from upstream of the transport mechanism 22.

The first roller 42 supports the medium M at the same height as the guide portion 45 in the height direction −Z. Thus, it is possible to adopt a straight path configuration in the printing region, not only when transporting the soft medium M1 such as the fabric, but also when transporting the hard medium M2 such as the board paper. The hard medium M2 having the straight path configuration can be transported through a path substantially parallel to the ejecting unit 62. Thus, it is possible to secure the printing quality for both the soft medium M1 and the hard medium M2.

Comparative Example

Figure 5:
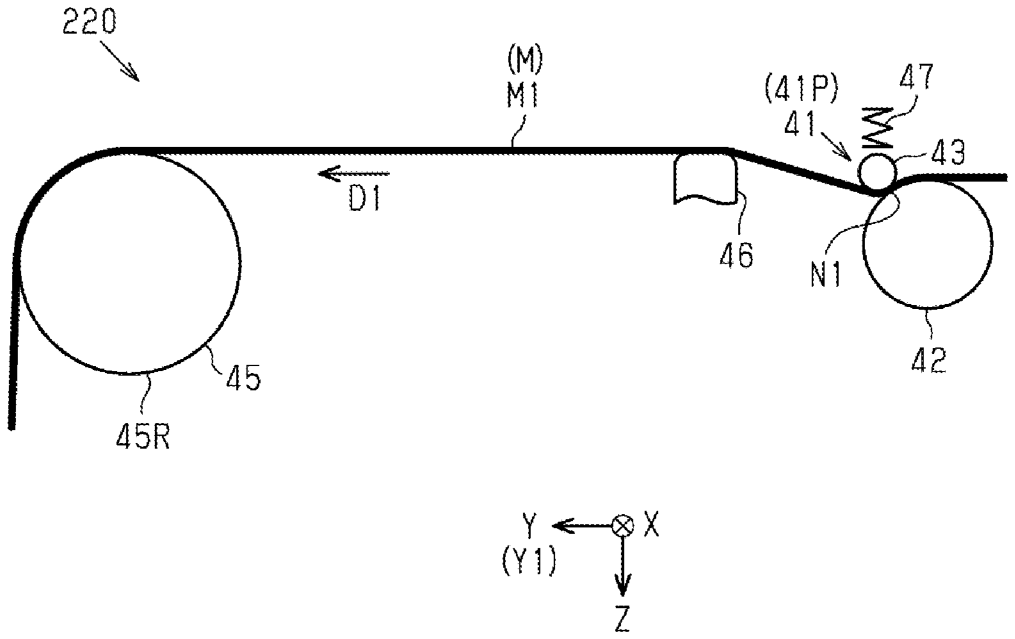
FIG. 5 is a schematic side view illustrating a transport mechanism when transporting the soft medium in a comparative example.
Figure 6:
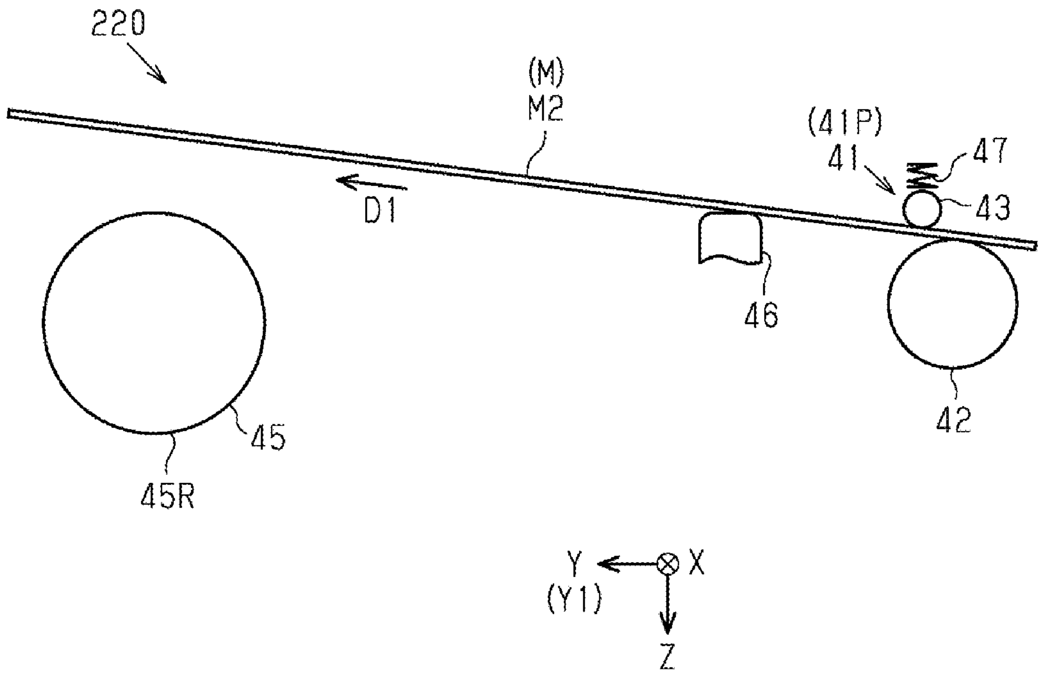
FIG. 6 is a schematic side view illustrating the transport mechanism when transporting the hard medium in the comparative example.

FIGS. 5 and 6 illustrate a comparative example. FIGS. 5 and 6 illustrate a transport mechanism 220 of the comparative example. FIG. 5 illustrates an example of transporting the soft medium M1, and FIG. 6 illustrates an example of transporting the hard medium M2.

The transport mechanism 220 of the comparative example illustrated in FIG. 5 is obtained by adding the support portion 46 to a conventional transport mechanism including only the transport roller pair 41P and the guide roller 45R. Since the support portion 46 is added, the transport mechanism is not a known transport mechanism, and is the transport mechanism 220 that is not known and that is used for comparison with the configuration of the embodiment.

As illustrated in FIG. 5, the support portion 46 is disposed at a height position at which the support portion 46 can support the medium M at the same height as the height at which the guide portion 45 supports the medium M. In other words, the upper end of the guide roller 45R and the upper end of the support portion 46 are at the same height. On the other hand, in order to cause the nip position to be lower than the upper end of the support portion 46, the transport roller pair 41P is disposed at a height position at which the upper end of the first roller 42 is positioned lower than the upper end of the support portion 46. As illustrated in FIG. 5, when transporting the soft medium M1, the medium M1 is supported by the upper end of the support portion 46 and the upper end of the guide portion 45. Thus, the medium M1 is transported in a state of being parallel to the ejecting unit 62 (see FIG. 2).

On the other hand, as illustrated in FIG. 6, when transporting the hard medium M2 such as the board paper, the medium M2 is supported by the upper end of the first roller 42, which is lower than the upper end of the support portion 46, and the upper end of the support portion 46. Thus, as illustrated in FIG. 6, the medium M2 is transported in an inclined posture in which the medium M2 becomes higher as it is transported further downstream in the transport direction D1. In this case, since the medium M2 is not parallel to the ejecting unit 62 (refer to FIG. 2), the printing misalignment occurs. As a result, the required printing quality cannot be secured.

On the other hand, in the transport mechanism 22 of the embodiment, as illustrated in FIGS. 3 and 4, the upper end of the first roller 42 and the upper end of the guide roller 45R are set at the same height. Thus, even when transporting the hard medium M2, it is possible to form a horizontal straight path in which the medium M can be transported in a horizontal posture in the printing region, as illustrated in FIG. 4. Note that, in the liquid ejecting device 11 of a model that does not use the hard medium M2 such as the board paper, the transport mechanism 22 including the support portion 46 illustrated in FIG. 5 may be employed.

Detailed Configuration of Medium Support Structure

Next, a detailed configuration of the medium support structure of the embodiment will be described with reference to FIG. 7.

Figure 7:
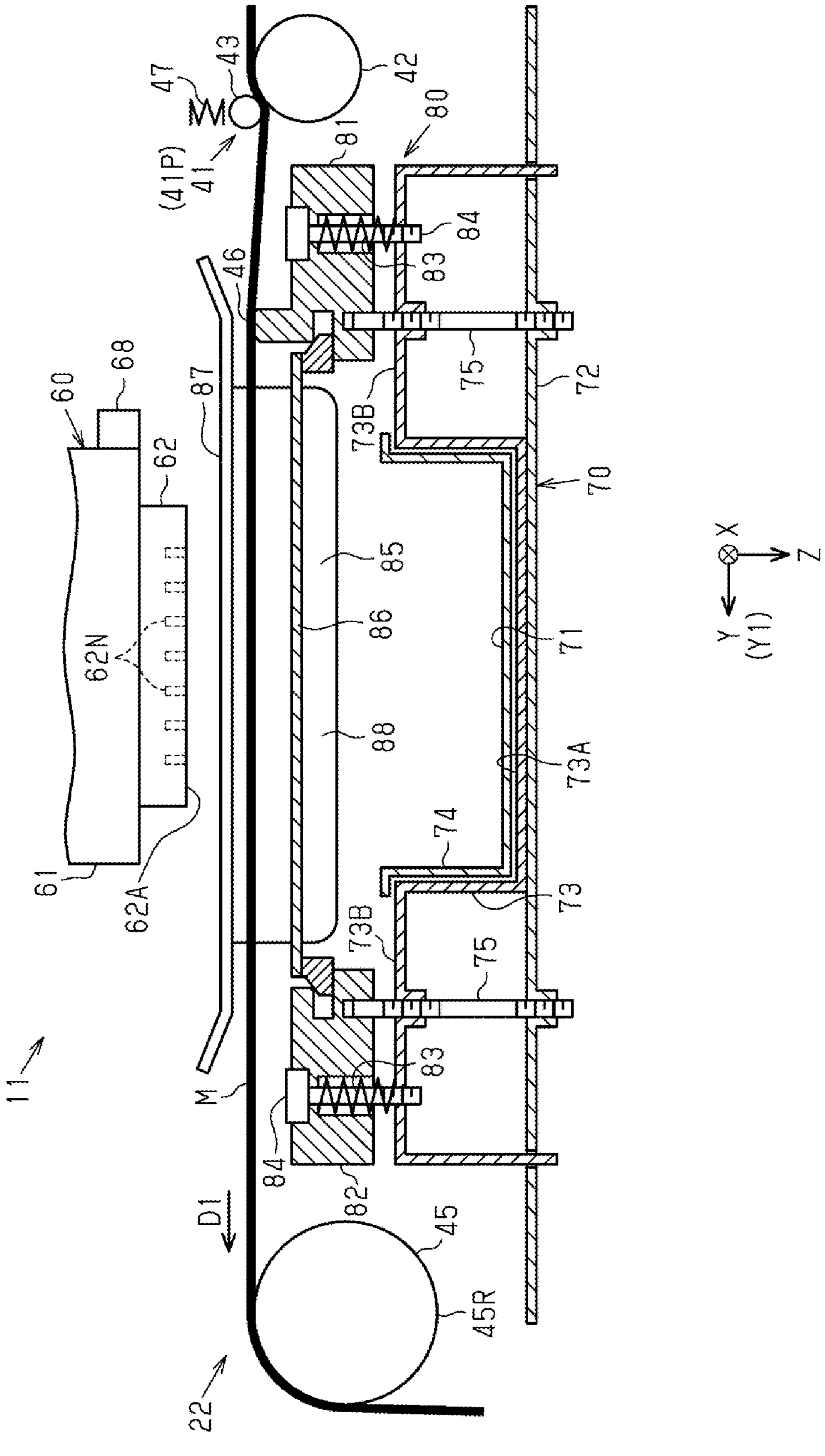
FIG. 7 is a side cross-sectional view illustrating an ejecting unit and a medium support structure according to a first example.

As illustrated in FIG. 7, the base portion 70 includes, for example, a base member 72 made of a metal plate, and a receiving member 73 made of a metal plate and fixed to the upper side of the base member 72. The base member 72 is, for example, a flat plate-shaped plate member. The receiving member 73 is bent into a shape having a recessed portion 73A at the center thereof. The receiving member 73 includes flat surface portions 73B positioned above the bottom surface of the recessed portion 73A in the height direction −Z, around the recessed portion 73A. The recessed portion 73A has an opening slightly wider than the printing region. A receiving tray 74 for receiving the liquid is detachably accommodated at the recessed portion 73A. In the example illustrated in FIG. 7, the receiving groove portion 71 is formed by the receiving tray 74. When the medium M is the fabric or the like through which the liquid easily seeps to the back surface thereof, of the liquid such as the ink ejected from the ejecting unit 62 and adhered to the medium M, the liquid having seeped through the medium is collected in the receiving tray 74, for example, as a result of the liquid dripping thereinto.

A first block member 81 is supported by the flat surface portion 73B, of the receiving member 73, disposed upstream of the receiving groove portion 71 in the transport direction Y1, so as to be displaceable in the vertical direction Z. On the lower side of the first block member 81, the guide shaft 75 is screwed to the base member 72 and the receiving member 73 in a state in which the guide shaft 75 is disposed to be oriented in a direction in which the axial line of the guide shaft 75 is parallel to the vertical direction Z. An upper portion of the guide shaft 75 is inserted into the first block member 81. The first block member 81 is displaceable in the vertical direction Z by being guided by the guide shaft 75. Further, an upper limit position of the first block member 81 is regulated by a screw 84, which is inserted from the upper side of the first block member 81, being screwed into the receiving member 73, in a state in which the first block member 81 is urged upward by the elastic force of an elastic member 83 formed of a coil spring. The first block member 81, the guide shaft 75, the elastic member 83, the screw 84, and the like constitute an adjustment mechanism 80 that adjusts the height of the support portion 46.

The transport mechanism 22 includes a regulating member 85 that regulates floating of a portion, of the medium M, facing the ejecting unit 62, and the adjustment mechanism 80 that is configured to be able to adjust the height position of the regulating member 85. The support portion 46 is provided at the first block member 81 as an example of a member provided so as to be displaceable in the height direction −Z together with the regulating member 85, among the members 75, 81, 83, and 84 and the like constituting the adjustment mechanism 80.

When the user rotates the screw 84 in a tightening direction, the first block member 81 is lowered, and when the user rotates the screw 84 in a loosening direction, the first block member 81 is raised. The support portion 46 protrudes from an upper surface portion of the first block member 81. In this embodiment, the screw 84 is an adjustment screw that adjusts the height position of the support portion 46. At the time of shipment, installation, or maintenance of the liquid ejecting device 11, the user operates the screw 84 to adjust the height position at which the support portion 46 supports the medium M to be the same height as the height at which the guide roller 45R supports the medium M. In this regard, the screw 84 is an adjustment screw that accommodates variations in the height or the like, which arise from component dimensional errors, assembly dimensional errors, and the like. The screw 84 is not adjusted in accordance with the type of the medium M.

Further, a second block member 82 is supported by the receiving member 73 at a position downstream of the receiving groove portion 71 in the transport direction Y1 so as to be displaceable in the vertical direction Z. The configuration in which the second block member 82 is displaceable in the vertical direction Z is basically the same as the configuration in which the first block member 81 is displaceable. In other words, the second block member 82 is provided so as to be displaceable in the vertical direction Z while being guided by the guide shaft 75. The second block member 82 is urged upward by the elastic force of the elastic member 83 formed of a coil spring, and the screw 84, which is inserted through the second block member 82, is screwed into the flat surface portion 73B of the receiving member 73. Accordingly, the user can adjust the height of the second block member 82 in the vertical direction Z by adjusting the screw 84.

The first block member 81 and the second block member 82 are adjusted to the same height position. The first block member 81 and the second block member 82 hold a support plate 86, of the regulating member 85, that is disposed therebetween. The regulating member 85 includes a regulating portion 87 that regulates the floating of the medium M within a predetermined range, and a side plate 88 that regulates the deviation of the medium M in the width direction X.

Nip Load Setting

Next, setting of a nip load, with which the transport roller pair 41P nips the medium M, will be described. As illustrated in FIG. 3, when the medium M is the soft medium M1 such as the fabric, in order for the transport roller pair 41P to be able to nip the medium M1, the urging force of the elastic member 47, which urges the second roller, needs to be greater than the front tension acting on the medium M1. On the other hand, as illustrated in FIG. 4, when the medium M is the hard medium M2 such as the board paper, as a condition for forming a straight path for the medium M2, the medium M2 needs to be able to lift up the second roller 43 against the urging force of the elastic member 47.

As described above, setting of a nip load NL by the second roller 43 satisfies a condition of the following Expression (1).

$$FT < NL < BG \quad (1)$$

Here, FT is the front tension (N), NL is the nip load (N), and BG is the stiffness of the board paper ($N/mm^2$).

Since the hardness of the board paper changes depending on the type (thickness) of the board paper, the value of the nip load NL may be controlled to change depending on the type of the board paper.

For example, the liquid ejecting device 11 includes an urging force adjustment mechanism (not illustrated) that can change the urging force that urges the second roller 43 downward in a stepwise or continuous manner. The urging force adjustment mechanism is assembled to a holding member (not illustrated) that rotatably holds the second roller 43. The holding member is supported by a main frame (not illustrated) so as to be swingable about the rotational fulcrum thereof. The holding member is urged by the elastic member 47 in a direction in which the second roller 43 is urged downward. One end of the elastic member 47 is fixed, and the other end thereof is supported by a movable body that is displaceable by rotating a cam. When the cam is rotated by the driving force of a motor (not illustrated), a stretch amount of the elastic member changes in a stepwise or continuous manner. In accordance with the stretch amount of the elastic member, the urging force, with which the holding member urges the second roller downward, is switched in a stepwise or continuous manner. The control unit 100 adjusts the nip load NL by controlling a motor that is a driving source of the urging force adjustment mechanism.

For example, when the print data is received, the control unit 100 acquires information about the type and the size of the medium from the print condition information included in the print data. The control unit 100 determines the type of the board paper from the type of the medium, controls the motor that is the driving source of the urging force adjustment mechanism, and adjusts the urging force by the elastic member 47 to a predetermined urging force corresponding to the type of the board paper, thereby adjusting the nip load NL to the value corresponding to the type of the board paper.

Operations

Next, operations of the liquid ejecting device 11 will be described.

In FIG. 7, by adjusting the screw 84 on the first block member 81 side in advance, the height at which the support portion 46 supports the medium M is adjusted to the same height as the height at which the guide portion 45 supports the medium M.

First, the soft medium M1 illustrated in FIG. 3 is transported in a state of being nipped by the transport roller pair 41P. At this time, as illustrated in FIG. 3, the medium M1 is supported by the support portion 46, while passing through a path extending obliquely upward from the nip position N1 toward the upper surface of the support portion 46. The height at which the support portion 46 supports the medium M is the same as the height at which the guide roller 45R supports the medium M. Further, a predetermined tension is applied to a portion of the medium M between the transport roller pair 41P and the guide roller 45R. Since the tension is applied to the medium M during the printing, the medium M is transported in a state of floating in the air. Thus, the medium M is transported in the printing region in a posture parallel to the nozzle surface 62A of the ejecting unit 62.

Therefore, the gap between the ejecting unit 62 and the medium M1 is kept constant. The character or the image is printed on the medium M by alternately performing the printing operation for one line (one scan) in which the ejecting unit 62 ejects the ink in the course of moving in the scanning direction X, and the transport operation in which the transport device 20 transports the medium M to the next printing position. At this time, since the gap between the ejecting unit 62 and the medium M1 is kept constant, the printing quality is secured. Further, the ink having seeped through to the back surface of the medium M during the printing is collected in the receiving groove portion 71.

Further, when the medium M is the hard medium M2 such as the board paper illustrated in FIG. 4, the medium M2 lifts up the second roller 43 against the urging force of the elastic member 47 due to the stiffness of the medium M2. As a result, the medium M2 is transported in a horizontal posture while being in contact with the upper end of the first roller 42. At this time, the support portion 46 illustrated in FIG. 7 may be slightly displaced downward by causing the elastic member 83 to contract by the force received from the medium M2, which is pressed downward by the urging force of the elastic member 47. Note that the spring constant of the elastic member 83 is set to a value greater than the spring constant of the elastic member 47. Thus, even if the support portion 46 is displaced downward, the amount of displacement is suppressed to an extremely small amount.

The upper end of the first roller 42 and the upper end of the support portion 46 are at the same height position. Furthermore, the upper end of the guide portion 45 and the upper end of the first roller 42 are at the same height position. Thus, the hard medium M2 is transported along a straight path that is in contact with the upper end of the first roller 42, the upper end of the support portion 46, and the upper end of the guide portion 45. Therefore, the gap between the ejecting unit 62 and the medium M2 is kept constant. As a result, even when the test printing is performed on the fabric attached to the board paper, the printing quality is secured.

Thus, with the first embodiment, it is possible to obtain the following effects.

(1) The liquid ejecting device 11 includes the transport unit 41, the ejecting unit 62, the receiving groove portion 71, the guide portion 45, and the support portion 46. The transport unit 41 transports the medium M in the transport direction D1 while nipping the medium M by the first roller 42, and the second roller 43 that can press the medium M against the first roller 42. The ejecting unit 62 ejects the liquid onto the medium M at the position downstream of the transport unit 41 in the transport direction D1. The receiving groove portion 71 faces the ejecting unit 62 in a height direction −Z intersecting a transport direction D1. The guide portion 45 guides the medium M at the position downstream of the ejecting unit 62 in the transport direction D1. The support portion 46 is provided so as to be able to support the medium M at the position upstream of the receiving groove portion 71 and downstream of the transport portion 41 in the transport direction D1. According to this configuration, it is possible to inhibit the medium M from becoming slack between the transport unit 41 and the guide portion 45, and it is thus possible to suppress the deterioration in the printing quality.

(2) The support portion 46 is provided so as to be able to support the medium M at the same height as the guide portion 45 in the height direction −Z. According to this configuration, since the support portion 46 supports the medium M at the same height as the guide portion 45, the medium M is in a state of being substantially parallel to the ejecting unit 62, and it is thus possible to more reliably suppress the deterioration in the printing quality.

(3) The position of the axial center of the second roller 43 in the transport direction D1 is located downstream of the position of the axial center of the first roller 42 in the transport direction D1. According to this configuration, the winding length of the medium M, wound over the first roller 42 and the second roller 43 when the medium M is nipped therebetween, is increased, and the transport accuracy is thus improved. Further, by being supported by the support portion 46, the medium M pushed down by the second roller 43 is pushed up to the same height as the guide portion 45. As a result, both the transport accuracy and the printing quality can be achieved.

(4) The first roller 42 supports the medium M at the same height as the guide portion 45 in the height direction −Z. According to this configuration, it is possible to adopt the straight path configuration not only when transporting the soft medium M such as the fabric, but also when transporting the hard medium M such as the board paper. The hard medium M having the straight path configuration can be transported in the path substantially parallel to the ejecting unit 62. Thus, it is possible to secure the printing quality for both the soft medium M and the hard medium M.

(5) The regulating member 85 that regulates the floating of the portion of the medium M facing the ejecting unit 62, and the adjustment mechanism 80 that is configured to be able to adjust the height position of the regulating member 85 are provided. The support portion 46 is provided at the first block member 81 as an example of the member provided so as to be displaceable in the height direction −Z together with the regulating member 85, among the members constituting the adjustment mechanism 80. According to this configuration, when the height position of the support portion 46 is adjusted, in conjunction with the adjustment, the height of the regulating member 85 is also adjusted. Therefore, both the adjustment of the support portion 46 whose height is adjusted in order to adjust the height of the medium M, and the adjustment of the regulating member 85 whose height is adjusted in accordance with the height of the medium M are performed in an interlocked manner. Thus, the adjustment operation can be easily performed.

Second Embodiment

Next, the liquid ejecting device 11 according to a second embodiment will be described with reference to FIGS. 8 to 13. Note that, since the basic configuration of the liquid ejecting device 11 is the same as that of the first embodiment, the configuration of the transport mechanism 22 will be mainly described below.

The support portion 46 may be disposed at a height at which the support portion 46 can support the medium M at a height different, in the height direction, from the height at which the guide portion 45 supports the medium M. In this case, since the medium M is transported along a path that is slightly inclined with respect to the horizontal direction, the medium M is slightly inclined with respect to the nozzle surface 62A of the ejecting unit 62. Thus the gap between the nozzle 62N and the medium M varies depending on the position of the nozzle 62N. However, unless there is any particular problem in terms of the required printing accuracy, the slight inclination of the medium M is tolerated. For example, the inclination of the medium M with respect to the nozzle surface 62A of the ejecting unit 62 may be a value within a range of 1 to 5°.

The height at which the first roller 42 supports the medium M may be lower than the height at which the guide portion 45 supports the medium M.

The support portion 46 is configured to be displaceable between a first position that is a height at which the support portion 46 can support the medium M at the same height as the height at which the guide portion 45 supports the medium M, and a second position that is a height at which the support portion 46 can support the medium M at a height between the guide portion 45 and the first roller The liquid ejecting device 11 includes a switching mechanism 50 that switches the support portion 46 between the first position and the second position.

Figure 8:
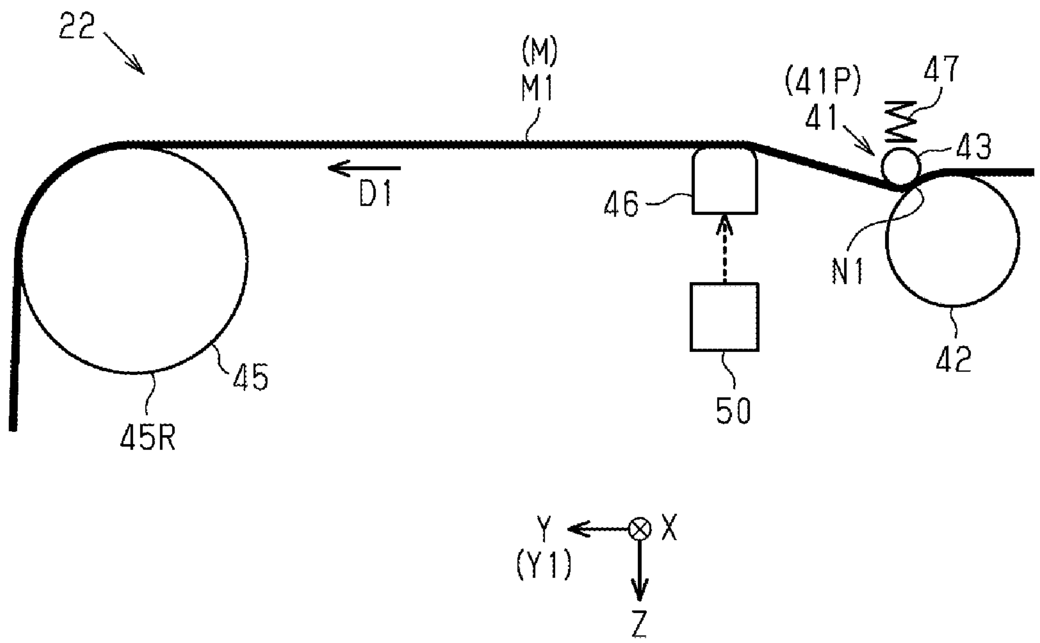
FIG. 8 is a schematic side view illustrating a transport mechanism when transporting the soft medium in a second embodiment.
Figure 9:
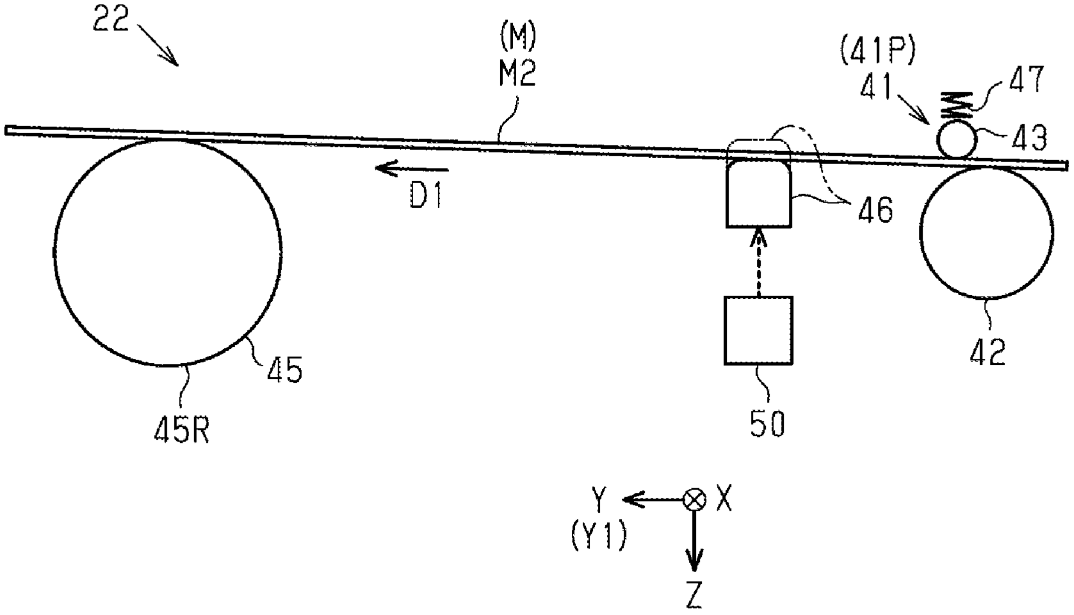
FIG. 9 is a schematic side view illustrating the transport mechanism when transporting the hard medium.

As illustrated in FIGS. 8 and 9, the height at which the support portion 46 supports the medium M is switched by the switching mechanism 50 between the first position illustrated in FIG. 8 (indicated by a two dot chain line in FIG. 9) and the second position indicated by a solid line in FIG. 9. When the medium M is the soft medium M1 such as the fabric illustrated in FIG. 8, the support 46 is displaced to the first position that is the same height as the guide portion 45. On the other hand, when the medium M is the hard medium M2 such as the board paper, the support portion 46 is displaced to the second position that is the height between the guide portion 45 and the first roller 42.

Next, a plurality of examples of the configuration of the switching mechanism 50 capable of performing the above-described switching with respect to the support portion 46 will be described.

Examples of the switching mechanism 50 include a screw type, a D-shaped roller type, and a tension rod type. A specific configuration of each of the types will be described below in order. Note that the screw type will be referred to as a first example, the D-shaped roller type will be referred to as a second example, and the tension rod type will be referred to as a third example. Note that the support portion 46 in FIGS. 8 and 9 is schematically illustrated, and thus, may have a different shape from the shape of the specific support portion 46 illustrated in each of the following examples.

First Example

First, the first example in which the screw type switching mechanism 50 is employed will be described. In the screw type, for example, the adjustment mechanism 80 for adjusting the height of the support portion 46 in the first embodiment is used as the switching mechanism 50. Thus, the screw type switching mechanism 50 is described with reference to FIG. 7. Note that the switching mechanism 50 in this first example has basically the same configuration as the adjustment mechanism 80 illustrated in FIG. 7. However, in order to switch the support portion 46 between the first position and the second position, the maximum displacement amount by which the support portion 46 can be vertically displaced is set to be larger than the maximum displacement amount in the first embodiment. Further, although the switching mechanism 50 is described with reference to FIG. 7, since the switching mechanism 50 is different from the adjustment mechanism 80 illustrated in FIG. 7 in its purpose and displacement amount, the adjustment mechanism 80 will be referred to as the switching mechanism 50 for convenience in the following description of the first example.

The switching mechanism 50 (adjustment mechanism 80) illustrated in FIG. 7 adjusts the height position of the support portion 46 by the user manually turning the screw 84 using a tool such as a screwdriver. When the user adjusts the screw 84, the support portion 46 is switched to the first position that is the height position at which the support portion 46 can support the medium M at the same height as the guide portion 45. When the user tightens the screw 84 in a state in which the support portion 46 is at the first position, the support portion 46 is switched to the second position at which the height at which the support portion 46 supports the medium M is the height position between the guide portion 45 and the first roller 42.

Further, although the screw 84 is employed while assuming that the user operates the screw 84, the screw 84 may be adjusted using power of a driving unit. In this case, the configuration is not limited to the screw, and may be any configuration as long as it has a screw shaft similar to that of the screw. For example, a rotating shaft of a driving unit such as a motor may be coupled to a lower end portion of the screw or the screw shaft. By controlling the driving unit such as the motor to rotate in the normal rotation direction or the reverse rotation direction, the control unit 100 axially rotates the screw or the screw shaft in the normal rotation direction or the reverse rotation direction. When the control unit 100 drives the driving unit in the normal rotation direction, the screw or the screw shaft axially rotates in the normal rotation direction. As a result, the support portion 46 is raised. On the other hand, when the control unit 100 drives the driving unit in the reverse rotation direction, the screw or the screw shaft axially rotates in the reverse rotation direction. As a result, the support portion 46 is lowered.

For example, when the print data is received, the control unit 100 acquires information about the type and the size of the medium from the print condition information included in the print data. When the control unit 100 recognizes that the type of the medium acquired from the printing condition information is the hard medium M2 such as the board paper, the control unit 100 controls the motor, which is a driving source of the switching mechanism 50, and adjusts the height position of the support unit 46 to be the second position via the switching mechanism 50. On the other hand, when the control unit 100 recognizes that the type of the medium acquired from the printing condition information is the soft medium M1 such as the fabric, the control unit 100 controls the motor, which is the driving source of the switching mechanism 50, and adjusts the height position of the support unit 46 to be the first position via the switching mechanism 50.

Second Example

Figure 10:
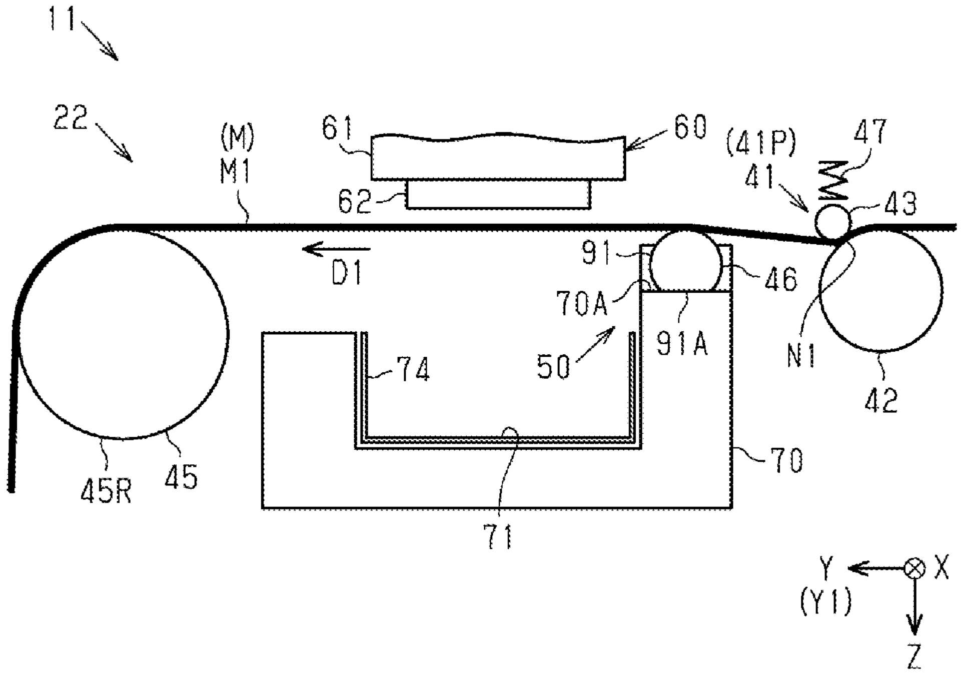
FIG. 10 is a schematic side sectional view illustrating a transport mechanism when transporting the soft medium in a second example.

Next, the D-shaped roller type switching mechanism 50 will be described with reference to FIGS. 10 and 11. As illustrated in FIG. 10, a roller 91 having a D-cut shape (hereinafter also referred to as a "D-shaped roller 91") constituting the support portion 46 is supported on an upper end portion 70A, which is a portion, of the base portion 70, extending upward at a position upstream of the receiving groove portion 71 in the transport direction D1.

The D-shaped roller 91 has a shape in which a portion of the outer circumferential surface thereof is cut along a plane parallel to the axial line thereof. The D-shaped roller 91 has a D-shaped cross section as illustrated in FIGS. 10 and 11, when cut along a virtual plane orthogonal to the axial line thereof. The D-shaped roller 91 has a flat surface 91A corresponding to a cut surface, and a convex curved surface (arc-shaped surface) corresponding to a surface other than the flat surface 91A.

The D-shaped roller 91 is supported so as to be rotatable about the axial center thereof, for example. The D-shaped roller 91 becomes rotatable, for example, by operating a stopper (not illustrated) to be in a release position. Then, by adjusting the attitude angle of the stopper, and then operating the stopper to be in an operation position, the stopper is held at the attitude angle. Note that the D-shaped roller 91 may be supported at a position other than the axial center thereof, so as to be eccentrically rotatable.

As illustrated in FIG. 10, by adjusting the D-shaped roller 91 to have a first attitude angle at which the convex curved surface is positioned so as to be oriented upward, the support portion 46 is switched to the first position at which the medium M1 can be supported at the same height as the guide unit 45. When the medium M is the soft medium M1, the D-shaped roller 91 is switched to the first position. The soft medium M1 is nipped by the first roller 42 and the second roller 43 at the nip position N1, at which the soft medium M1 is wound over a portion of the outer circumferential surface of the first roller 42 at the transport unit 41. Since the nip position is lower than the upper end of the support portion 46, the medium M1 is pressed against the convex curved surface of the support portion 46. By being supported at the same height by the support portion 46 and the guide portion 45, the medium M1 is transported in a substantially horizontal posture in a state in which a tension is applied thereto.

Figure 11:
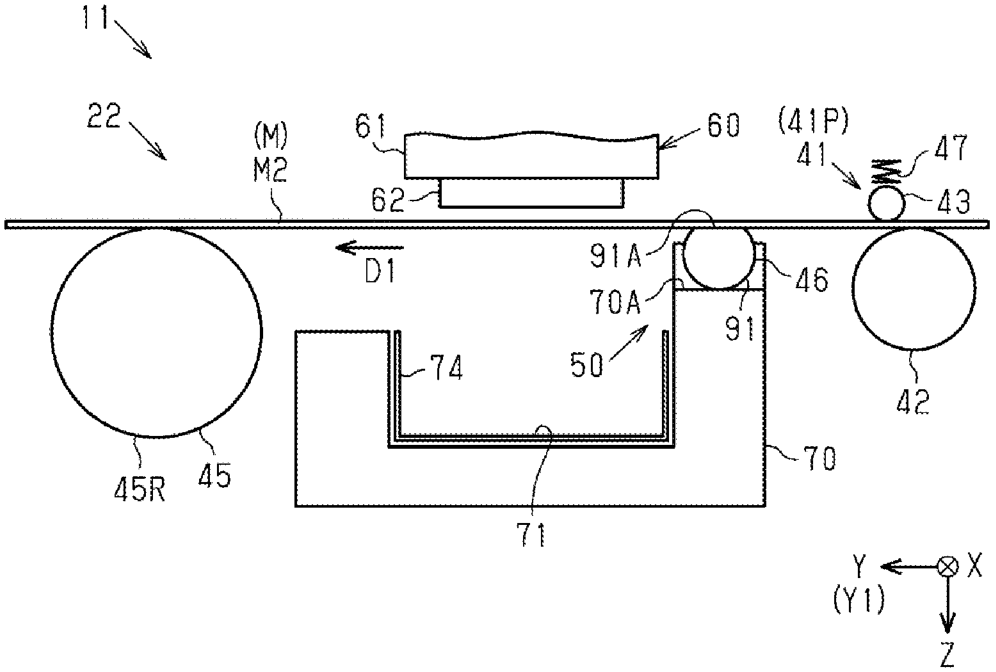
FIG. 11 is a schematic side cross-sectional view illustrating the transport mechanism when transporting the hard medium.

On the other hand, as illustrated in FIG. 11, when the medium is the hard medium M2 such as the board paper, the D-shaped roller 91 is adjusted to have the second attitude angle at which the flat surface 91A is positioned so as to be oriented upward. As a result, the support portion 46 is adjusted to the second position at which the support portion 46 can support the medium M1 at the height between the height at which the guide portion 45 supports the medium M and the height at which the first roller 42 supports the medium M. In other words, when the medium M is the hard medium M2, the D-shaped roller 91 is adjusted to the second position. The hard medium M2 is supported at the upper end of the first roller 42 at the transport unit 41. At this time, the second roller 43 is lifted upward against the urging force of the elastic member 47 due to the stiffness of the medium M2.

The flat surface 91A of the support portion 46 supports the medium M2 at an intermediate height position between the first roller 42 and the guide portion 45. As a result, the hard medium M2 is transported in a state of being supported by the upper end of the first roller 42, the flat surface 91A of the support portion 46, and the upper end of the guide portion 45. In this case, the medium M2 is slightly inclined with respect to the horizontal plane, but the inclination is set to be within a range in which there is no problem in terms of the required printing quality. Further, when the hard medium M2 is the board paper, since the test printing is performed on a test fabric attached to the board paper, there is not much problem in this respect either.

Third Example

Next, the tension rod type switching mechanism 50 will be described with reference to FIGS. 12 and 13.

Figure 12:
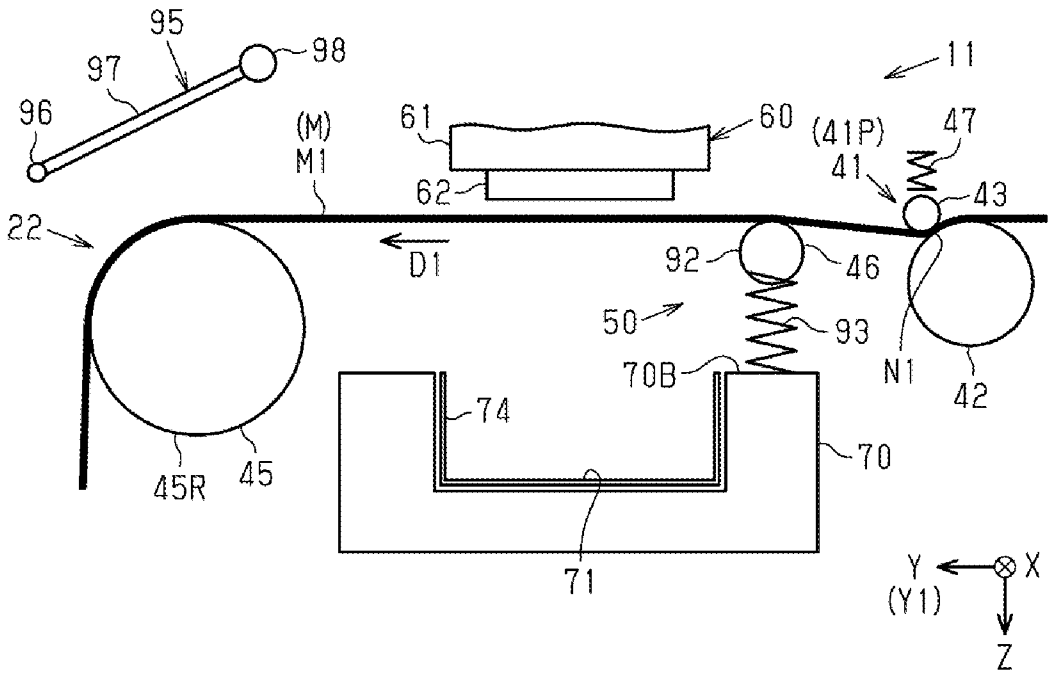
FIG. 12 is a schematic side cross-sectional view illustrating a transport mechanism when transporting the soft medium in a third example.

As illustrated in FIG. 12, a cylindrical guide rod 92 (tension rod) is urged upward by an elastic member 93 such as a spring in a state in which the axial line of the guide rod 92 is disposed to be oriented in a direction parallel to the width direction X. A base end portion of the elastic member 93 is fixed to an upper surface 70B of the base portion 70, and a tip portion of the elastic member 93 is fixed to the guide rod 92. The upper limit height position of the height of the guide rod 92 is limited by the guide rod 92 coming into contact with a stopper (not illustrated), so that the height at which the guide rod 92 supports the medium M is caused to be the same height at which the guide portion 45 supports the medium M. In other words, the guide rod 92, which is the support portion 46, is disposed at the first position at which the guide rod 92 can support the medium M1 at the same height as the guide portion 45 in a state in which the guide rod 92 is urged upward by the elastic member 93.

Further, in the vicinity of the guide portion 45, a pressing member 95 is provided in a rotatable state. The pressing member 95 can press the floated medium M downward at a position slightly upstream of the guide roller 45R in the transport direction Y1. The pressing member 95 includes an arm 97 rotatable about a rotation shaft 96, and a pressing rod 98 supported by a tip portion of the arm 97. The pressing rod 98 is not limited to a rod and may be a roller.

Thus, as illustrated in FIG. 12, the soft medium M1 is nipped by the first roller 42 and the second roller 43 at the nip position at which the soft medium M1 is wound over a portion of the outer circumferential surface of the first roller 42. Since the nip position is lower than the upper end of the support portion 46, the medium M1 is pressed against a curved surface of an upper end portion of the guide rod 92. By being supported at the same height by the support portion 46 and the guide portion 45, the medium M1 is transported in a substantially horizontal posture in a state in which a tension is applied thereto.

Figure 13:
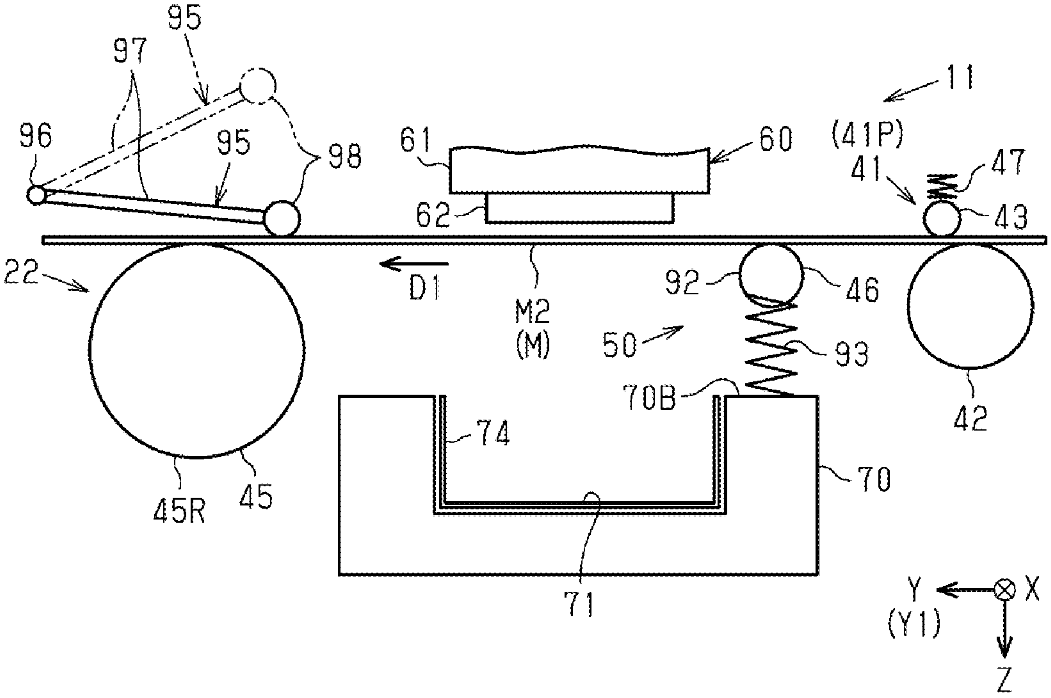
FIG. 13 is a schematic side cross-sectional view illustrating the transport mechanism when transporting the hard medium.

On the other hand, as illustrated in FIG. 13, the guide rod 92 is pushed by the hard medium M2, and is slightly lowered from the upper limit position thereof. In other words, the guide rod 92 is lowered to the second position at which the height position at which the guide rod 92 supports the medium M is a height position between the height position at which the guide portion 45 supports the medium M and the height position at which the first roller 42 supports the medium M. At this time, the guide rod 92 is pushed down against the urging force of the elastic member 93 due to the stiffness of the hard medium M2. In other words, due to the stiffness of the medium M2, the height of the guide rod 92 is switched to the second position, which is the height position between the guide portion 45 and the first roller 42.

At this time, the height position at which the first roller 42 and the guide rod 92 support the medium M is lower than the height position at which the guide portion 45 supports the medium M. Thus, the medium M is inclined to be in an oblique posture in which the position of the medium M becomes higher as the medium M moves further downstream in the transport direction D1. When a downstream end portion of the medium M2 in the transport direction D1 is float up or is about to float up, the pressing member 95 rotates from a retracted position thereof, indicated by a two dot chain line in FIG. 13 to a pressing position thereof, indicated by a solid line in FIG. 13, at which the pressing member 95 can press the upper surface of the medium M2. As a result, the hard medium M2 is transported in a state of being supported by the upper end of the first roller 42, the upper end of the guide rod 92, and the upper end of the guide portion 45. In this case, the medium M2 is slightly inclined with respect to the horizontal plane, but the inclination is set to be within a range in which there is no problem in terms of the required printing quality. Further, when the hard medium M2 is the board paper, since the test printing is performed on the test fabric attached to the board paper, there is not much problem in this respect either.

Thus, according to the second embodiment, the following effects can be obtained in addition to the effects (1) to (3) of the first embodiment.

(6) The height at which the first roller 42 supports the medium M is lower than the height at which the guide portion 45 supports the medium M. The support portion 46 is configured to be displaceable between a first position that is a height at which the support portion 46 can support the medium M at the same height as the height at which the guide portion 45 supports the medium M, and a second position that is a height at which the support portion 46 can support the medium M at a height between the guide portion 45 and the first roller Further, the switching mechanism for switching the support part 46 between the first position and the second position is provided. According to this configuration, it is possible to adopt the straight path configuration not only when transporting not only the soft medium M such as the fabric, but also when transporting the hard medium M such as the board paper.

Note that the embodiments described above can be modified into the following modified examples. Furthermore, an example obtained by appropriately combining the above-described embodiment and any of the modified examples described below can be used as a further modified example, and an example obtained by appropriately combining the modified examples described below can be used as a further modified example.

Figure 14:
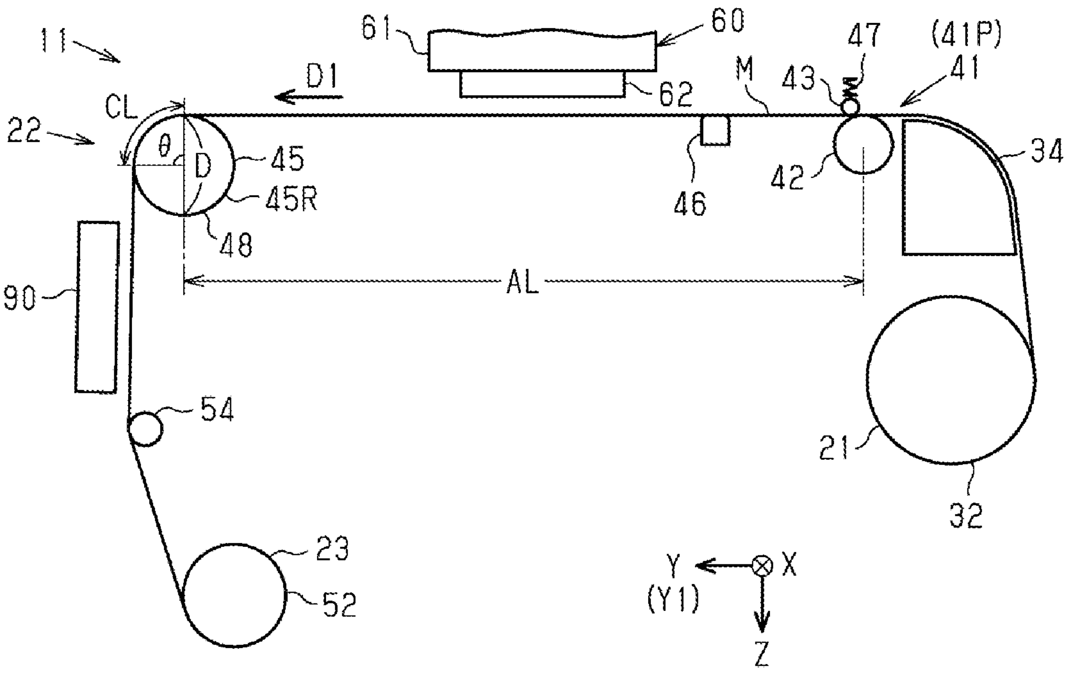
FIG. 14 is a schematic side view illustrating the liquid ejecting device according to a modified example.

As illustrated in FIG. 14, a friction coefficient μ of the guide portion 45 may be set in accordance with values of the diameter D and the inter-axis distance AL of the guide portion 45. At the outer circumferential surface of the guide portion 45, the friction coefficient μ with respect to the medium M is set to a predetermined value by the material itself of the guide roller 45R or a low friction layer 48 formed at the outer circumferential surface of the guide roller 45R. In the example illustrated in FIG. 14, the guide roller 45R has the low friction layer 48 at the outer circumferential surface thereof. The low friction layer 48 may be formed by attaching a low friction tape to the outer circumferential surface of the guide roller 45R, or may be formed by performing low friction processing on the outer circumferential surface of the guide roller 45R.

Here, a portion, of the medium M, between the transport unit 41 and the guide portion 45 contracts due to cockling caused by adhesion of the ink to the portion. The cockling is a phenomenon in which a printed portion of the medium M contracts as a result of the fibers of the medium M contracting due to moisture in the ink. Depending on the material of the medium M, the cockling may occur as a result of the fibers of the medium M swelling and being extended due to the moisture in the ink, and the extension causing wrinkles to be generated in the medium M. Further, in the liquid ejecting device 11 including a heating unit 90, a portion of the medium M heated by the heating unit 90 contracts. Since the moisture in the ink adhered to the medium M is evaporated by the heating, the medium M contracts. This type of contraction of the medium M changes the tension of the medium M. In the medium M, an imbalance in the tension occurs between a first region that is a region between the first roller 42 and the guide roller 45R, and a second region that is a region between the guide roller 45R and the winding unit 23. The first region includes the printing region in which the printing is performed on the medium M by the ink ejected from the ejecting unit 62. Thus, it is preferable that an appropriate tension capable of suppressing the cockling be applied to the first region. Further, the second region includes a heating region heated by the heating unit 90. Thus, the medium M contracts in the second region. This contraction causes the wrinkles to be generated in the second region of the medium M. The contact resistance between the guide roller 45R and the medium M acts to suppress propagation of the wrinkles from the second region to the first region.

The larger the contact area between the guide roller 45R and the medium M, the greater the frictional resistance generated at a contact portion therebetween. The contact area between the guide roller 45R and the medium M is determined by the winding angle θ of the medium M with respect to the guide roller 45R, and the diameter D of the guide roller 45R.

Thus, in order to suppress the propagation of the wrinkles in the second region to the first region while suppressing the wrinkles caused by the cockling in the first region, it is preferable to appropriately adjust the tension in the first region, the frictional resistance of the guide roller 45R with respect to the medium M, and the tension in the second region. Therefore, in the liquid ejecting device 11, the inter-axis distance AL, the diameter D of the guide roller 45R, and the friction coefficient μ of the guide roller 45R are set so as to satisfy an appropriate condition shown in FIG. 15. Here, the inter-axis distance AL is determined in accordance with the model of the liquid ejecting device 11.

Figure 15:
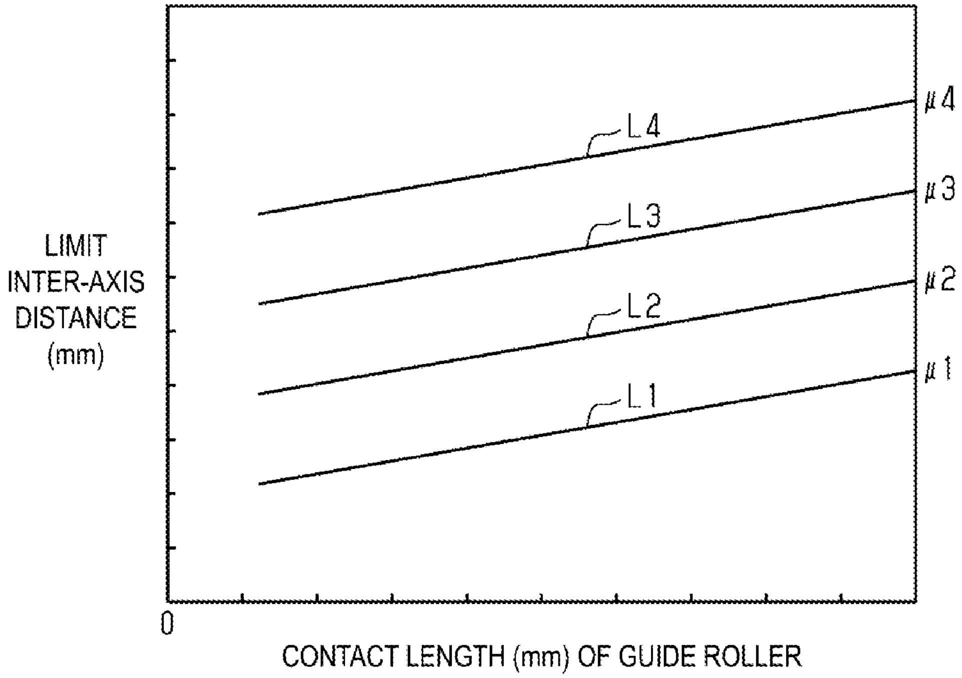
FIG. 15 is a graph showing a relationship between a contact length of a guide roller and a limit inter-axis distance.

In the graph shown in FIG. 15, the horizontal axis represents the contact length (mm) of the guide roller 45R, and the vertical axis represents the limit inter-axis distance (mm). When the inter-axis distance AL satisfying one condition (diameter D) has a certain range, the limit inter-axis distance indicates the limit of the range. In the graph shown in FIG. 15, a graph line L1 is employed for a model having the small inter-axis distance AL. Based on the model, the graph line L1 is determined that corresponds to a range of the limit inter-axis distance to which the inter-axis distance AL belongs. The graph line L1 is a graph line in which the friction coefficient μ is set to satisfy $\mu=\mu 1$. The contact length of the guide roller 45R is determined so as to be a value on the graph line L1. The contact length is determined by the winding angle θ and the diameter D. In the graph shown in FIG. 15, graph lines L1 to L4 are shown as an example, but the number of the graph lines can be set as desired. In the liquid ejecting device 11, the contact length and the friction coefficient μ of the medium M with respect to the guide roller 45R are set in accordance with the inter-axis distance AL so as to satisfy the condition shown in the graph of FIG. 15. In this way, in the liquid ejecting device 11, the contact length may be set to be an appropriate contact length CL with which the cockling does not occur, based on the inter-axis distance AL and the friction coefficient μ. In other words, when the inter-axis distance AL is determined, the friction coefficient μ corresponding to the inter-axis distance AL is determined. When the friction coefficient μ is determined, the contact length CL corresponding to the friction coefficient μ is determined. The diameter D of the guide roller 45R (however, the winding angle θ is substantially constant) is set so that this contact length CL is obtained.

According to this configuration, it is possible to suppress the cockling in the printing region of the medium M. Further, in the liquid ejecting device 11 including the heating unit 90, it is possible to inhibit the contraction of the medium M due to the heating, from affecting the printing region. Note that, in the liquid ejecting device 11, which does not include the heating unit 90, although natural drying is performed, wrinkles are generated due to contraction of the medium M caused by the drying. Thus, the same effect is obtained by satisfying the condition shown in FIG. 15. The frictional resistance of a portion, of the medium M, at which the support portion 46 supports the medium M is sufficiently smaller than the frictional resistance at the transport portion 41 and the guide portion 45. Even in a configuration that does not include the support portion 46, the same effect can be obtained by satisfying the condition shown in FIG. 15.

In the above-described embodiments, the support portion is disposed at the position upstream of the receiving groove portion 71 in the transport direction D1. However, a second support portion may be disposed at a position downstream of the receiving groove portion 71 and upstream side of the guide portion in the transport direction D1.

In the first embodiment, the height of the medium M1 pushed down by the second roller 43 may be the same as the height at which the support portion 46 supports the medium M and the height at which the guide portion 45 supports the medium M. Even in this case, both the transport accuracy and the printing quality can be achieved. Note that, although the pressing force of the medium M against the support portion 46 becomes weak or is not obtained so much, it becomes easier to inhibit the medium M1 from becoming slack or sagging at least in the printing region, compared to a configuration in which the support portion 46 is not provided.

Although the support portion 46 of the first embodiment has the shape having the horizontal flat surface at the upper end thereof, the shape may be changed to a columnar rod shape or a shape having a semi-columnar convex portion at the upper end thereof. Further, the support portion 46 may be changed to a rotatable roller.

In the third example, the support portion 46 may be a guide roller urged by the elastic member 93 in a rotatable state, instead of the guide rod 92.

In the second embodiment, the driving unit may be omitted, and manual driving may be performed. In the case of the manual driving, for example, a notification unit may be provided that notifies the user of information prompting the user to change the height of the support unit 46 in accordance with the type of the medium (for example, cloth or board paper) that is input to the liquid ejecting device 11 by the user operating the operation unit 18. The notification unit may be, for example, the display unit 15 or a sound generation unit. When the notification unit is the display unit 15, based on the control by the control unit 100, the display unit 15 displays the information prompting the user to change the height of the support unit 46 using an image, characters, or the like. Further, when the notification unit is the sound generation unit, the sound generation unit may generate a sound based on the control by the control unit 100, to notify the user of the information prompting the user to change the height of the support unit 46. Further, the notification unit may be a communication terminal such as a smartphone. In this case, the information prompting the user to change the height of the support unit 46 may be notified to the user by performing communication from a server device capable of communicating with the control unit 100 of the liquid ejecting device 11, to the communication terminal such as the smartphone.

The medium M is not limited to the fabric such as the cloth and the non-woven fabric, the board paper, and the like, and may be a sheet, a film made of synthetic resin, a laminated medium including a synthetic resin layer and a metal layer, or the like.

The printing device 11 is not limited to the textile printing device, and may be an ink jet-type printer that performs printing on a sheet. For example, when the printing is performed on paper having a relatively large gap between paper fibers, or paper having a high ink permeability, the printing device may be a gutter platen-type printing device, including the receiving groove portion 71, that performs printing by ejecting a large amount of ink onto the paper.

Below, a description will be made of technical concepts together with effects understood from the embodiments and the modified examples described above.

(A) A liquid ejecting device includes a transport unit configured to transport a medium in a transport direction while nipping the medium between a first roller and a second roller configured to press the medium toward the first roller, an ejecting unit configured to eject a liquid onto the medium at a position downstream of the transport unit in the transport direction, a receiving groove portion facing the ejecting unit in a height direction intersecting the transport direction, a guide portion configured to guide the medium at a position downstream of the ejecting unit in the transport direction, and a support portion configured to support the medium at a position upstream of the receiving groove portion and downstream of the transport unit in the transport direction.

According to this configuration, it is possible to inhibit the medium from becoming slack between the transport unit and the guide portion, and it is thus possible to suppress deterioration in the printing quality.

(B) In the liquid ejecting device according to (A), the support portion may be configured to support the medium at a same height as the guide portion in the height direction.

According to this configuration, since the support portion supports the medium at the same height as the guide portion, the medium is in a state of being substantially parallel to the ejecting unit, and it is thus possible to more reliably suppress the deterioration in the printing quality.

(C) In the liquid ejecting device according to (B), a position of an axial center of the second roller in the transport direction may be disposed at a position downstream of a position of an axial center of the first roller in the transport direction.

According to this configuration, the winding length of the medium, wound over the first roller and the second roller when the medium is nipped therebetween, is increased, and the transport accuracy is thus improved. Further, by being supported by the support portion, the medium pushed down by the second roller is pushed up to the same height as the guide portion. As a result, both the transport accuracy and the printing quality can be achieved.

(D) In the liquid ejecting device according to (B) or (C), the first roller may support the medium at the same height as the guide portion in the height direction.

According to this configuration, it is possible to adopt a straight path configuration not only when transporting a soft medium such as fabric, but also when transporting a hard medium such as board paper. The hard medium having the straight path configuration can be transported in a path substantially parallel to the ejecting unit. Thus, it is possible to secure the printing quality for both the soft medium and the hard medium.

(E) The liquid ejecting device according to any one of (A) to (D) may include a regulating member configured to regulate floating of a portion, of the medium, facing the ejecting unit, and an adjustment mechanism configured to adjust a height position of the regulating member. The support portion may be provided, among members constituting the adjustment mechanism, at a member configured to be displaceable together with the regulating member in the height direction.

According to this configuration, when the height position of the support portion is adjusted, in conjunction with the adjustment, the height of the regulating member is also adjusted. Therefore, both the adjustment of the support portion whose height is adjusted in order to adjust the height of the medium, and the adjustment of the regulating member whose height is adjusted in accordance with the height of the medium are performed in an interlocked manner. Thus, the adjustment operation can be easily performed.

(F) In the liquid ejecting device according to any one of (A) to (C), a height at which the first roller supports the medium may be lower than a height at which the guide portion supports the medium, and the support portion may be configured to be displaceable between a first position, which is a height at which the support portion is configured to support the medium at the same height as the height at which the guide portion supports the medium, and a second position, which is a height at which the support portion is configured to support the medium at a height between the guide portion and the first roller. The liquid ejecting device may include a switching mechanism configured to switch the support portion between the first position and the second position.

According to this configuration, it is possible to adopt the straight path configuration not only when transporting the soft medium such as the fabric, but also when transporting the hard medium such as the board paper.

What is claimed is:

1. A liquid ejecting device comprising:

a transport unit configured to transport a medium in a transport direction while nipping the medium between a first roller and a second roller configured to press the medium toward the first roller;

an ejecting unit configured to eject a liquid onto the medium at a position downstream of the transport unit in the transport direction;

a receiving groove portion facing the ejecting unit in a height direction intersecting the transport direction;

a guide portion configured to guide the medium at a position downstream of the ejecting unit in the transport direction;

a support portion configured to support the medium at a position upstream of the receiving groove portion and downstream of the transport unit in the transport direction;

a regulating member configured to regulate floating of a portion, of the medium, facing the ejecting unit; and an adjustment mechanism configured to adjust a height position of the regulating member, wherein the support portion is provided, among members constituting the adjustment mechanism, at a member configured to be displaceable together with the regulating member in the height direction.

2. The liquid ejecting device according to claim 1, wherein the support portion is configured to support the medium at a same height as the guide portion in the height direction.

3. The liquid ejecting device according to claim 2, wherein a position of an axial center of the second roller in the transport direction is disposed at a position downstream of a position of an axial center of the first roller in the transport direction.

4. The liquid ejecting device according to claim 2, wherein the first roller supports the medium at the same height as the guide portion in the height direction.

5. The liquid ejecting device according to claim 2, wherein a height at which the first roller supports the medium is lower than a height at which the guide portion supports the medium, the support portion is configured to be displaceable between a first position, which is a height at which the support portion is configured to support the medium at the same height as the height at which the guide portion supports the medium, and a second position, which is a height at which the support portion is configured to support the medium at a height between the guide portion and the first roller, and the liquid ejecting device comprises a switching mechanism configured to switch the support portion between the first position and the second position.

6. A liquid ejecting device comprising:

a transport unit configured to transport a medium in a transport direction while nipping the medium between a first roller and a second roller configured to press the medium toward the first roller;

an ejecting unit configured to eject a liquid onto the medium at a position downstream of the transport unit in the transport direction;

a receiving groove portion facing the ejecting unit in a height direction intersecting the transport direction;

a guide portion configured to guide the medium at a position downstream of the ejecting unit in the transport direction; and a support portion configured to support the medium at a position upstream of the receiving groove portion and downstream of the transport unit in the transport direction, wherein the support portion is configured to support the medium at a same height as the guide portion in the height direction, a height at which the first roller supports the medium is lower than a height at which the guide portion supports the medium, the support portion is configured to be displaceable between a first position, which is a height at which the support portion is configured to support the medium at the same height as the height at which the guide portion supports the medium, and a second position, which is a height at which the support portion is configured to support the medium at a height between the guide portion and the first roller, and the liquid ejecting device comprises a switching mechanism configured to switch the support portion between the first position and the second position.

7. The liquid ejecting device according to claim 6, wherein a position of an axial center of the second roller in the transport direction is disposed at a position downstream of a position of an axial center of the first roller in the transport direction.

8. The liquid ejecting device according to claim 6, wherein the first roller supports the medium at the same height as the guide portion in the height direction.

* * * * *